United States Patent
Kuwabara

[11] Patent Number: 5,968,428
[45] Date of Patent: Oct. 19, 1999

[54] MOLDING METHOD FOR POWDER PARTICLES

[75] Inventor: Mitsuo Kuwabara, Tsurugashima, Japan

[73] Assignee: Honda Giken Kogyo Kabushiki Kaisha, Tokyo, Japan

[21] Appl. No.: 08/883,372

[22] Filed: Jun. 26, 1997

[30] Foreign Application Priority Data

Jul. 1, 1996 [JP] Japan ................................. 8-171395

[51] Int. Cl.$^6$ .............. B28B 1/26; B28B 3/00; B22F 3/00
[52] U.S. Cl. ................ 264/86; 264/649; 264/651; 264/669; 264/670; 264/125; 419/36; 419/37; 419/42; 419/63; 419/10
[58] Field of Search ................ 264/86, 125, 649, 264/651, 669, 670; 419/36, 37, 42, 63, 10

[56] References Cited

U.S. PATENT DOCUMENTS

| | | | |
|---|---|---|---|
| 4,283,360 | 8/1981 | Henmi et al. | 264/670 |
| 4,478,785 | 10/1984 | Huseby et al. | 501/96 |
| 4,814,302 | 3/1989 | Matje et al. | 264/86 |
| 4,840,763 | 6/1989 | Freitag | 264/86 |
| 5,164,138 | 11/1992 | Dietl et al. | 264/86 |
| 5,242,872 | 9/1993 | Taniguchi et al. | 264/670 |

FOREIGN PATENT DOCUMENTS 4-211904  8/1992  Japan .

*Primary Examiner*—James Derrington
*Attorney, Agent, or Firm*—Birch, Stewart, Kolasch & Birch, LLP

[57] ABSTRACT

Disclosed is a molding method for powder particles, which is excellent in molding performance, and which makes it possible to obtain a preliminary molded product excellent in strength by enhancing mutual bonding between particles in the preliminary molded product. A molding apparatus for powder particles includes an outer frame die having a mold space with a lower punch and an upper punch to be slidably fitted thereto. Slight clearances exist between the outer frame die and the lower and upper punches. A mixture is prepared by mixing a powdery raw material with a liquid additive to cause an exothermic reaction therewith.

16 Claims, 6 Drawing Sheets

MOLDING METHOD FOR POWDER PARTICLES

BACKGROUND OF THE INVENTION

1. Field of the Invention

The present invention relates to a molding method for powder particles and a molded product obtained by this method. In particular, the present invention relates to a molding method for powder particles for obtaining a molded product having a high particle filling density by chemically reacting a powdery raw material so that the particles are joined to one another, and the molded product obtained by this method.

2. Description of the Related Art

Conventionally, there have been methods for producing molded products by pressurizing and molding powdery raw materials, including, for example, a molding method based on the use of isostatic pressurization. The present inventors have been already suggested such a molding method based on the use of isostatic pressurization in Japanese Laid-Open Patent Publication No. 4-211904. In this method, a mixture obtained by adding a liquid to a powdery raw material is subjected to uniaxial molding under pressure, wherein excessive liquid is removed to mold a preliminary molded product.

However, in the case of the molding method based on the use of the isostatic pressurization as described above, the filling state of particles in the preliminary molded product should be taken into consideration. Namely, it has been confirmed that the particles are joined to one another in a manner of point-to-point contact by the aid of the intermolecular force.

SUMMARY OF THE INVENTION

A general object of the present invention is to provide a molding method for powder particles, which is excellent in molding performance and which makes it possible to obtain a preliminary molded product excellent in heat resistance and strength by enhancing mutual bonding between particles in the preliminary molded product, and a molded product obtained by this method.

A principal object of the present invention is to provide a molding method for powder particles, which makes it possible to obtain a molded product having excellent strength by performing isostatic pressurization after adding a liquid additive to a powdery raw material to cause an exothermic reaction, and reacting the powder particles with each other without increasing the amount of the liquid additive, and a molded product obtained by this method.

Another object of the present invention is to provide a molding method for powder particles, in which an exothermic reaction between the powder particles and a liquid additive is suppressed in the initial stage of the molding process, the exothermic reaction is allowed to occur at a desired timing, the heat generated by the exothermic reaction allows the raw material particles to be melted and fused with each other, and thus the particles are integrated with each other to increase the strength of a preliminary molded product, and a molded product obtained by this method.

Still another object of the present invention is to provide a molding method for powder particles, in which a mixture comprising the powder particles and a liquid additive is subjected to molding in a mold by the aid of isostatic pressurization, an excessive amount of the liquid additive is gradually discharged from the mold to allow the timing of pressurization to coincident with that of an exothermic reaction, and thus the raw material particles are appropriately dispersed by the aid of the pressurization and the exothermic action so that the filling rate is improved, and a molded product obtained by this method.

Still another object of the present invention is to provide a molding method for powder particles, in which the mixture as described above is molded in a mold, the liquid quantity is discharged by exposing the mixture to air, the raw material particles are coated with a gas of a reaction product produced as a result of the exothermic reaction while making it possible to obtain high fluidity, the mold is filled with the particles even when they are left to stand stationarily while making it possible to obtain a preliminary molded product having a desired shape, the raw material particles are melted and fused with each other after the gas disappears owing to occurrence of an additional exothermic reaction, and thus the strength of the preliminary product is increased, and a molded product obtained by this method.

Still another object of the present invention is to provide a molding method for powder particles, which makes it possible to more effectively avoid the occurrence of an active exothermic reaction before a desired timing by adding, to a mixture, a regulatory agent to suppress the exothermic reaction between the powder particles and a liquid additive up to the critical point so that a molded product excellent in quality is obtained, and a molded product obtained by this method.

Still another object of the present invention is to provide a molding method for powder particles, in which a preliminary molded product is sintered in a state in which the preliminary molded product maintains open pores by the aid of isostatic pressurization after completion of the isostatic pressurization step, so that the density of the molded product is increased, consequently making it possible to obtain the molded product excellent in strength, and a molded product obtained by this method.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

In order to achieve molding from powder particles with excellent molding performance so that a molded product having excellent strength is produced, a method has been investigated, in which the strength is remarkably improved without increasing the amount of any additive such as a binder. Consequently, in view of the reactivity of a raw material powder, a process has been realized, in which particles are directly joined to one another. In order to improve the filling state of a molded product composed of powder particles, this process adopts the isostatic pressurization molding method based on the use of a mold.

At first, a method has been investigated, in which a liquid additive is used to form a isostatic pressurizing state for a raw material powder in a mold, and an excessive quantity of the liquid additive is discharged through clearances of the mold, so that the liquid additive reacts with particles when a part of the raw material particles directly make contact, making it possible to increase the particle density.

The system for reacting the liquid additive with the particles is firstly selected. Combinations for this purpose are shown in Table 1.

TABLE 1

| POWDER | LIQUID |
| --- | --- |
| ALUMINUM NITRIDE | WATER, METHANOL, ETHANOL |
| TITANIUM NITRI DE | WATER, METHANOL |
| SILICON CARBIDE | WATER, METHANOL |
| CHROMIUM NITRIDE | WATER, METHANOL, EtHANOL |
| MAGNESIUM OXIDE | WATER, METHANOL, ETHANOL |
| METAL POWDER HAVING DIAMETER NOT MORE THAN 1 0 p m (Ni, Co ,Fe, AI, Mg, Cr, V, Mo ,W, Si, Ti,.etc.) | WATER, METHANOL, ETHANOL |

The combinations shown in Table 1 are selected as those which can be handled relatively easily, and which are readily available. However, other numerous combinations of the liquid additive and the powder particles can be used for the system to cause the exothermic reaction.

For example, the liquid may include methylamine, formamide, and trimethylamine. These liquids gradually make reaction with the powder to cause hydration or produce ammonia. However, the reaction proceeds slowly when these liquid additives are used.

Figure 1:
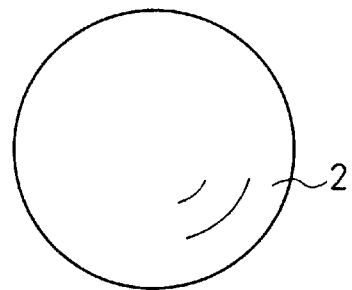
FIG. 1 schematically shows a particle of powder particles when a liquid quantity of a liquid additive exists in too large an amount.
Figure 2:
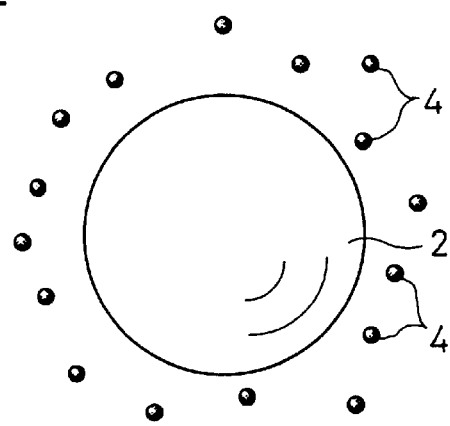
FIG. 2 schematically shows a particle of powder particles when a liquid quantity of a liquid additive exists in too small an amount.
Figure 3:
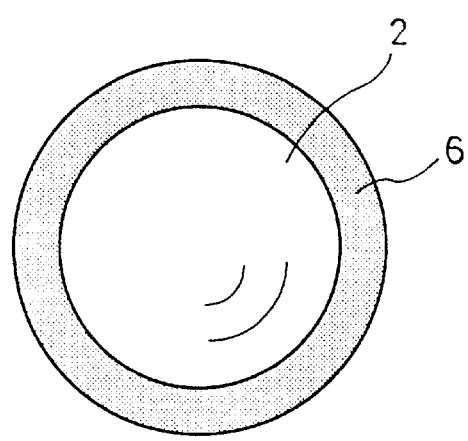
FIG. 3 schematically shows a particle of powder particles coated with a film when a liquid additive exists in a critical amount.

Accordingly, the system is added with a regulatory agent which suppresses the reaction until the critical point, and which quickly causes the reaction when the critical point is exceeded. A particle 2 of the powder particles shown in FIG. 1 is in a state in which the liquid quantity of the liquid additive exists in too large an amount. In this state, even when the reaction occurs, the heat is scattered by the liquid additive. Therefore, the reaction does not become vigorous. On the contrary, a particle 2 of the powder particles shown in FIG. 2 is in a state in which the liquid quantity of the liquid additive exists in a too small amount. In this state, the regulatory agent reacts with the particle 2 to produce a reaction product 4. However, the reaction does not proceeds to an extent that the reaction product 4 forms a film for covering the particle 2. FIG. 3 shows a state in which the liquid additive exists in a critical amount. In this state, the particle 2 of the powder particles or the liquid additive reacts with the regulatory agent to form a film 6. FIG. 3 shows a cross section only for the film 6. Those which have the function to produce the film 6 may be replaced with those generally used as conventional binders and dispersing agents.

As described above, the progress of the reaction is extremely slow, or the progress of the reaction is in an almost stopped state, for example, during the mixing step in which the liquid additive exists in a large amount, because of the too large amount of the liquid additive. When the amount of the liquid additive is decreased, the particle 2 of the powder particles or the liquid reacts with the regulatory agent to form the film 6. After that, when the specified critical point is exceeded, the film 6 begins to disappear, and the exothermic reaction quickly proceeds.

The initiation point of the reaction between the particle 2 and the liquid additive occupies a small area. Therefore, it is indispensable to effect the thermal action in order to continue the reaction. From this viewpoint, the reaction resembles the self-combustion reaction. Namely, when the reaction is started, the heat is generated, and the reaction is accelerated by the heat.

The velocity and the degree of progress of the reaction are controlled by changing the amount of the liquid additive and the temperature, as well as the partial pressure when the reaction product is a gas. The film 6 is also necessary to maintain the amount of the liquid additive to be in the vicinity of a certain value for a long period of time. The film 6 is indispensable during storage and transport. The film 6 is necessary and indispensable when the isostatic pressurization is utilized in a mold during the process of molding.

Namely, a constant liquid quantity is maintained until the material is arranged in the mold. When a isostatic state is given by applying a pressure, an excessive liquid quantity is discharged through, for example, clearances between the mold and the punch, allowing the particles to contact with each other. When the excessive liquid quantity is discharged, and the system arrives at or exceeds the critical point at which the liquid additive reacts with the particles, then the reaction rapidly proceeds. The amount of heat generated in this process differs depending on the combination of the raw material powder particles and the liquid additive. However, in the case of the systems shown in Table 1, the amount of generated heat has a value of an extent at which the particles having been in point-to-point contact are melted and fused with each other.

Alternatively, the film 6 may be formed without applying any pressure, and then the liquid may be evaporated, for example, by means of ventilation. In this procedure, when the system arrives at or exceeds the critical point for the reaction between the powder particles and the liquid additive, then the heat is generated, the particles of the powder are practically covered with the gas of the reaction product at their surroundings, and the system gives high fluidity. At this time, the particles behave as if they are those of superfluidity. The outer peripheral portion of the powder forms a shape in conformity with the mold even when the powder is left to stand stationarily, giving a state in which a certain shape can be obtained.

Therefore, those having an extremely thin plate-shaped configuration, which have been hitherto difficult to be molded, can be molded. Moreover, the molded product is improved in uniformity, making it possible to obtain the molded product without any defect. Further, the reaction heat allows the particles to contact with each other in a form of a chain, the particles are joined to one another, and thus the solidity is increased.

In this embodiment, the raw material powder particles react at their surfaces with the liquid additive, and their shapes are changed to be different from those of the original raw material powder particles. Such a situation is advantageous to perform sintering. However, while assuming the occurrence of this state, it becomes necessary to add carbon powder, and perform nitriding again by utilizing nitrogen which forms a sintering atmosphere, and it becomes necessary to introduce a slight amount of hydrogen.

The regulatory agent which satisfies the foregoing requirements, i.e., the protective film-forming agent is at least one or more than one selected from the group consisting of polyammonium carbonate, triisodecyl alcohol, vinyl butyral, stearic acid amine, carbamic acid ester, ammonium alginate, water-soluble phenol resin, polyvinyl acetal, and polyvinyl acetate. It is desirable that the regulatory agent is added in a total amount of 0.1 g to 8 g with respect to 100 g of the powder particles.

If the regulatory agent is added in an amount less than 0.1 g, the amount is not sufficient to form the film 6, and the liquid quantity of the liquid additive is evaporated to the outside of the system to disappear before the exothermic reaction is activated. As a result, the exothermic reaction cannot be controlled, an obtained molded product is inferior in uniformity, and the yield in the molding process is decreased.

On the other hand, it has been confirmed by the present inventors that if the regulatory agent is added in an amount exceeding 8 g, the film 6 is produced in an excessive amount, and the exothermic reaction scarcely occurs.

Now, the exothermic reaction will be considered. It is necessary to generate a large number of initiation points of the reaction, at which the liquid additive reacts with the powder particles, in a portion in which they are dispersed in the mixture, because of the following reason. Namely, if the initiation points of the reaction are concentrated on a certain specified area, the sintering action proceeds locally along with the generation of heat, resulting in nonuniform portions formed during rearrangement of the particles. If such a molded product is sintered, the product suffers occurrence of deformation, cracks and so on.

It has been confirmed by the present inventors that the particle diameter of the mixture composed of the raw material powder particles and the liquid is desirably not more than 10 μm on average, because of the reason described above.

If the particle diameter of the mixture has a dimension of not more than submicron, the mixture is difficult to be handled, and it reacts with the liquid additive to cause oxidation or hydration. For this reason, it is feared that those different from the initial substance or the desired substance may be obtained. On the contrary, when the particle diameter is not less than submicron, the sintered product containing desired components is obtained by the aid of, for example, addition of carbon and utilization of the sintering atmosphere, even when the exothermic reaction occurs with the liquid additive.

Based on the knowledge as described above, preferred embodiments will be referred to, and detailed explanation will be made below with reference to the accompanying drawings, for the molding method for powder particles according to the present invention.

Figure 4:
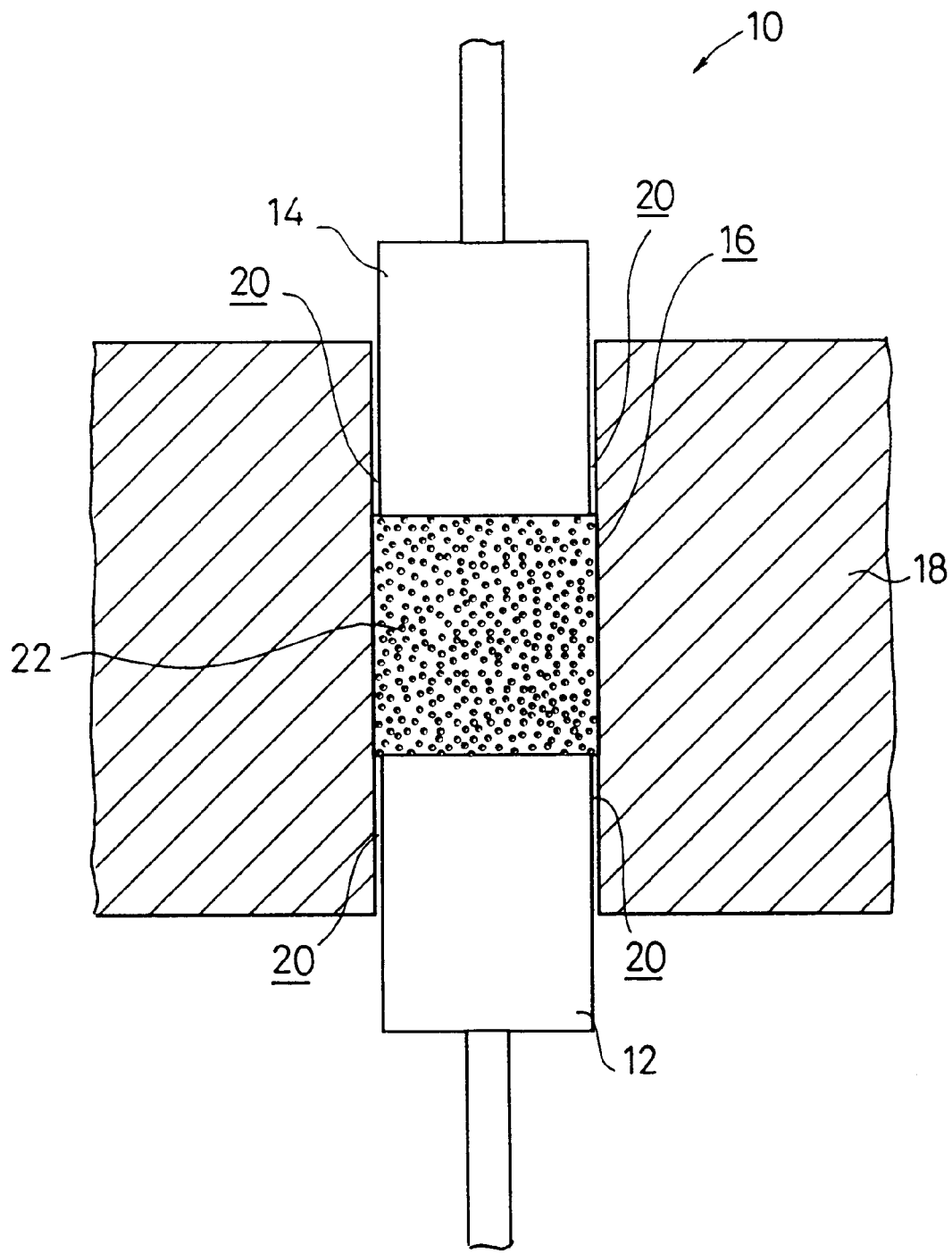
FIG. 4 schematically shows a cross-sectional view illustrating a molding apparatus for powder particles according to a first embodiment of the present invention.

In FIG. 4, reference numeral 10 indicates a molding apparatus for powder particles according to a first embodiment. The molding apparatus 10 for powder particles basically comprises an outer frame die 18 having a mold space 16 with a lower punch 12 and an upper punch 14 to be slidably fitted thereto. Slight clearances 20 exist between the outer frame die 18 and the lower and upper punches 12, 14. A mixture 22 to be used comprises powder particles prepared from a raw material of ceramic or metal powder, a liquid additive composed of, for example, water and/or alcohol, and a regulatory agent mixed with each other. The liquid additive causes an exothermic reaction with the raw material substances. The regulatory agent does not function when the liquid additive exists in an abundant amount without being discharged. The regulatory agent protects the particles 2 of the powder particles with the film 6 as shown in FIG. 3 so that the regulatory agent suppresses occurrence of the exothermic reaction between the liquid additive and the powder particles. However, it has been confirmed by the present inventors that the film 6 has such a property that it exists when the liquid quantity of the liquid additive is in the critical amount, while it disappears as the liquid quantity is decreased from the critical amount.

The molding apparatus 10 for powder particles according to this embodiment is basically constructed as described above. Next, its operation, function, and effect will be explained.

At first, the mixture 22 is prepared by mixing the powder particles, the liquid additive, and the regulatory agent. The regulatory agent is at least one or more than one selected from the group consisting of polyammonium carbonate, triisodecyl alcohol, vinyl butyral, stearic acid amine, carbamic acid ester, ammonium alginate, water-soluble phenol resin, polyvinyl acetal, and polyvinyl acetate.

The regulatory agent is added in a total amount of 0.1 g to 8 g with respect to 100 g of the powder particles. The selected powder particles have an average particle diameter of not more than 10 μm.

Subsequently, the mixture is introduced into the mold space 10 of the molding apparatus 10 for powder particles. The lower punch 12 and the upper punch 14 are displaced to perform isostatic pressurization molding. As the mixture 22 is pressurized between the lower punch 12 and the upper punch 14, the liquid quantity in the mixture 22 is discharged through the slight clearances 20 existing between the outer frame die 18 and the lower and upper punches 12, 14.

As the liquid quantity is eliminated from the surroundings, the regulatory agent serves to decrease the film 6 with which the particles 2 of the powder particles have been covered. As a result, the powder particles directly contact with the particles of the liquid additive, and thus the exothermic reaction is activated. The exothermic reaction increases the temperature of the surroundings, and thus further exothermic reaction is induced. The heat generated by the exothermic reaction allows the adjacent particles of the powder particles to be melted and fused with each other. After that, the lower and upper punches 12, 14 are opened, and thus a preliminary molded product is obtained. The preliminary molded product has a structure excellent in internal uniformity owing to the effect obtained by the isostatic pressurization. Further, the filling density is increased owing to the mutual melting and fusion of the particles, making it possible to obtain the preliminary molded product which is excellent in strength.

Figure 5:
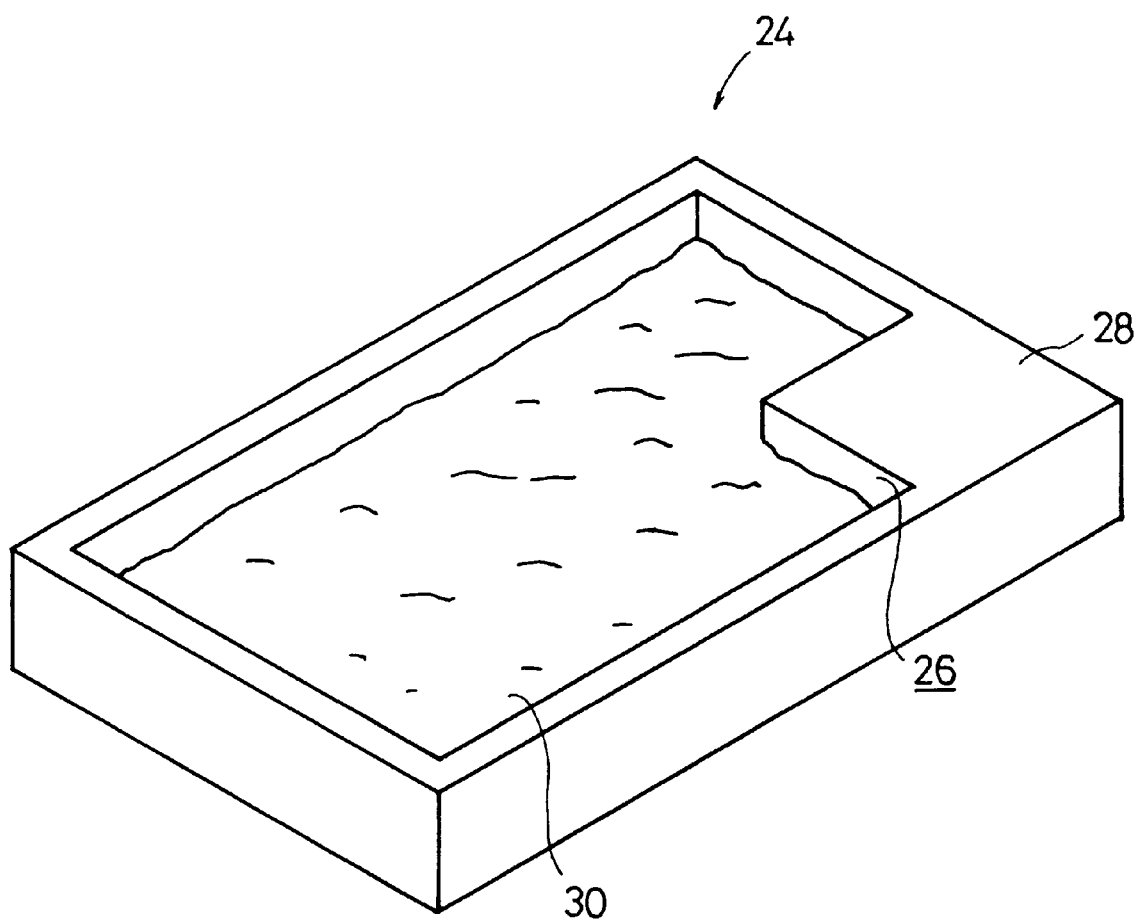
FIG. 5 schematically shows a cross-sectional view illustrating a molding apparatus for powder particles according to a second embodiment of the present invention.

FIG. 5 shows a molding apparatus 24 for powder particles according to a second embodiment. The molding apparatus 24 for powder particles basically comprises a mold 28 having a mold space 26.

Next, its operation, function, and effect will be explained.

This embodiment is characterized in that the liquid quantity of the liquid additive is removed by exposure to air, not by the pressurizing operation. The mixture 30 comprising the powder particles, the liquid additive, and the regulatory agent is the same as that used in the first embodiment.

In this embodiment, the liquid quantity of the mixture 30 is evaporated, for example, by means of ventilation so that the system arrives at or exceeds the critical point of the exothermic reaction between the powder particles and the liquid additive. During this process, the generated heat brings about a state in which the film 6 is covered with a gas of a reaction product, giving rise to high fluidity. At this time, the particles of the powder behave as if they have superfluidity. The particles spread along the mold space 26 of the mold 28 even when they are left to stand stationarily. Thus a shape corresponding to the mold space 26 is obtained.

Therefore, a molded product having an extremely thin configuration, which has been hitherto difficult to be molded, can be molded. Moreover, the molded product is improved in uniformity, making it possible to obtain the molded product without any defect. Further, mutual diffusion occurs provided that the particles make contact with each other by the aid of the reaction heat.

EXAMPLE 1

97% by weight of aluminum nitride powder having an average particle diameter of 1.5 $\mu$m, 2% by weight of yttrium oxide having an average particle diameter of 0.8 $\mu$m, and 1% by weight of ceric oxide having an average particle diameter of 1.0 $\mu$m were mixed to obtain 100 parts by weight of powder which was added with 32 parts by weight of water. The obtained powder was further added with polyammonium carbonate, carbamic acid ammonium ester, ammonium alginate, stearic acid amine, water-soluble phenol resin, and vinyl butyral in amounts of 0.3, 0.4, 0.2, 0.03, 0.2, and 0.02 part by weight respectively, followed by mixing with a ball mill for 4 hours, to which 0.01 part by weight of triisodecyl alcohol was then added, followed by mixing again for 10 minutes.

After the mixing, the liquid quantity was adjusted to be 13 parts by weight to perform pulverization, followed by passage through a 60 mesh sieve to obtain a press powder. A part of the powder was left to stand as it was, to measure the decrease of the liquid quantity, and the amount of the liquid quantity when the heat generation continuously occurred. The experiment for the powder was performed in a beaker made of glass inserted with a thermometer.

On the other hand, a powder was prepared in the same manner as described above except that only 30 parts by weight of water was added to 100 parts by weight of the powder. The prepared powder was subjected to the same experiment. Results are shown in FIG. 6.

As the amount of the liquid quantity was decreased, the increase in temperature in the beaker was observed even in the case of the powder added with only water. However, the situation of the increase in temperature was clearly different from situations of those added with the regulatory agent.

Figure 6:
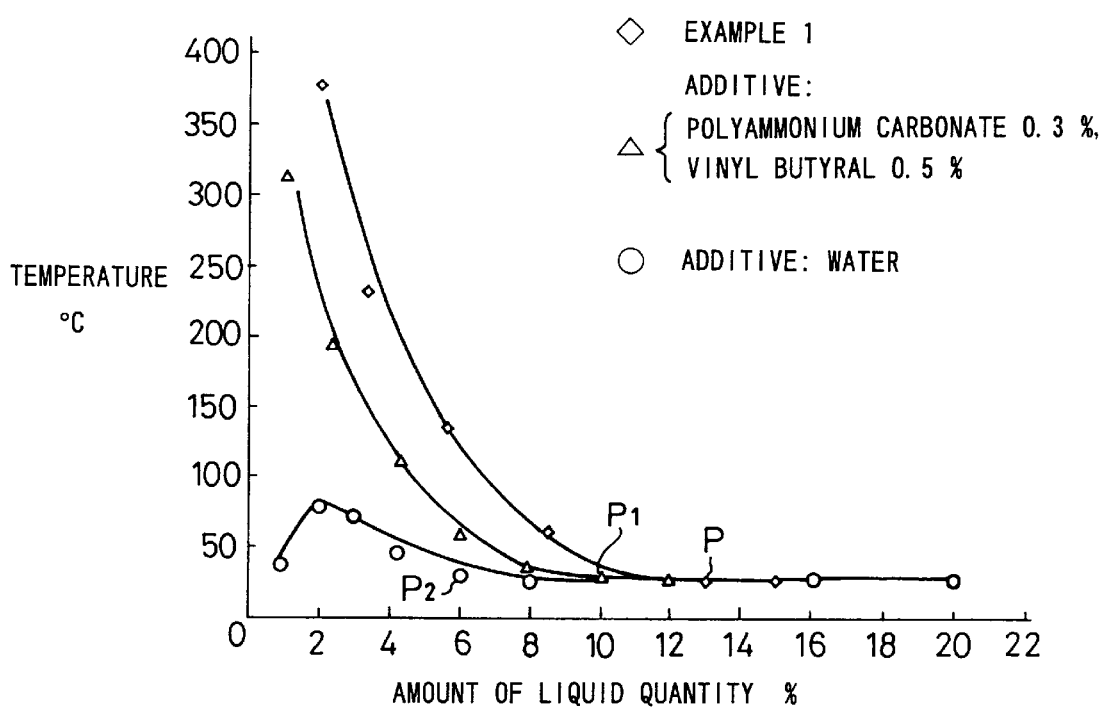
FIG. 6 shows a graph illustrating a result obtained in Example 1.

When the point P shown in FIG. 6 was exceeded, ammonium was suddenly produced. The reactivity could be confirmed according to this phenomenon, however, it was highly possibly assumed that particle surfaces of the raw material were oxidized, and a composition different from aluminum nitride might be obtained. Therefore, it is desirable that the amount of decomposition is measured previously, carbon or the like is added beforehand so that the velocity of decomposition is controlled, and nitrogen is utilized as an atmosphere gas during sintering to perform renitriding. In the case of the composition used in this experiment, the temperature in the beaker was not less than 350° C.

When the type and the amount of the additives were changed as shown in FIG. 6, the position of the point P was successfully changed to the points $P_1$ and $P_2$. When 0.3% polyammonium carbonate and 0.5% vinyl butyral were used, the point P was shifted to the point $P_1$. When only water was used as the additive, the point P was shifted to the point $P_2$.

Molded products having a size of 72×72 mm and thicknesses of 0.3, 0.8, or 30 mm respectively were molded under pressure by using the mixture. In this procedure, molded products were also produced by using a conventional grain powder for the purpose of comparison. As comparative samples, 10, 20, and 10 products were produced in trial production as having the foregoing size and thicknesses respectively, of which no one had a complete shape, all of which suffered defect, crack, lamination, and defective density.

When only water was added without adding the regulatory agent, the yield obtained after molding performed in the same manner as described above was 0, 5, and 3 individuals of 10, 20, 10 products produced in trial production respectively. On the contrary, the yield was 100% in all cases under the condition specified according to the embodiment of the present invention. The amount of the liquid quantity was 12% by weight upon the start of pressing, however, it was approximately 0% by weight after the pressing. The amount of the liquid quantity was decreased to a great extent as compared with the amount of about 5 to 7% by weight obtained for a molded product after the pressing in an ordinary isostatic molding process with a mold.

It has been confirmed by the present inventors that when the liquid quantity becomes not more than a certain amount, then the self-exothermic reaction occurs in a form of a chain reaction, the liquid quantity is consumed, the temperature is raised, and the liquid quantity is simultaneously evaporated. For this reason, the liquid quantity was almost 0% by weight. The pressing process was performed by applying a pressure of 120 MPa.

When a thin plate-shaped molded product is produced, the temperature of the mold is raised only at surface portions, because the press punch and the mold have large heat capacities. Therefore, there is no fear for handling. However, when a molded product having a relatively large thickness such as those having a thickness of 30 mm is produced, a phenomenon similar to hot press occurs due to the heat generated by the self-exothermic reaction. Such a phenomenon is advantageous to perform the molding. However, the large amount of generated heat may cause a problem of an increase in temperature of the punch, depending on the type of the additive or the magnitude of the pressing pressure. Therefore, attention should be paid upon handling in such a case.

The obtained molded products were subjected to a deflection test. As a result, the deflective strength was 18 to 30 MPa, which was 20 to 60 times the deflective strength of 0.5 to 0.8 MPa of conventional and ordinary powder molded products.

The obtained molded products were observed by using an electron microscope. As a result, portions were clearly found, in which particles were partially melted and fused with each other, which were confirmed by the present inventors such that the foregoing portions were greatly different from those in a form of particle aggregation found in the conventional molding process.

The temperature for particles to start sintering is considered to be about 1500° C. in the case of aluminum nitride, which is considered to be not less than 1200° C. even when alumina exists on the surface. Judging from this fact, it was assumed that sintering occurred at an extremely low temperature in the present invention. However, the temperature in the beaker was not less than 350° C., although the reaction actually occurred partially at minute microscopic areas. In view of this fact, it is assumed that the temperature of the reaction portion is higher than the observed result.

In general, in the case of the conventional method, the molding density was about 48 to 54%. However, in the case of the method according to the embodiment of the present invention, the molding density was 62 to 65% (pressing pressure: 100 MPa), 66 to 68% (pressing pressure: 120 MPa), and 71 to 72 (pressing pressure: 150 MPa). Namely, the molding density was extremely high, which was approximately equivalent to those obtained by metal powder molding.

As described above, the plastic molding, which has been impossible with ceramic powder, can be performed at ordinary temperature according to the present invention.

EXAMPLE 2

Explanation will be made for application of the method according to the embodiment of the present invention to a composite material comprising ceramics as major components. A basic system was a powder particle preparation obtained by mixing 80% by weight of tungsten carbide powder having an average particle diameter of 2.5 $\mu$m, 12% by weight of tungsten carbide powder having an average particle diameter of 0.6 $\mu$m, 7% by weight of metal cobalt powder having an average particle diameter of 1.0 $\mu$m, 1% by weight of metal zirconium powder having an average particle diameter of 1.5 $\mu$m, and 0.3% by weight of carbon black having an average particle diameter of 0.3 $\mu$m. A part of the tungsten carbide powder having the average particle diameter of 2.5 $\mu$m contained in the basic system was replaced with other powders to prepare several samples. The samples were used to perform experiments in the same manner as described in Example 1. Further, molded products were actually produced from the samples, followed by sintering to observe any change in their physical properties.

At first, a part of tungsten carbide was replaced with aluminum nitride having an average particle diameter of 1.2 $\mu$m. Experiments were performed such that the amount of aluminum nitride was changed in a range of 0.3 to 10% by weight in order to ascertain an appropriate amount in which the physical properties were not inferior to those of a preliminary molded product molded by using the basic composition.

Next, Sm—Co (samarium-cobalt, molar composition ratio: 2:17) powder was added in place of aluminum nitride to perform experiment in the same manner as described above. In this case, the amount of Co might be increased, if tungsten carbide was simply replaced with Sm—Co. Therefore, the composition was adjusted based on calculation so that the amount of Co was not changed. Besides, experiments were performed for those replaced with Mg (magnesium), Ti (titanium), Al (aluminum), V (vanadium), and Mo (molybdenum). Both water and ethanol were used as the liquid additive to observe any difference therebetween. The mixing process was performed for 4 hours with a ball mill. After that, 100 g of the powder was dispensed in a beaker to observe the change in amount of liquid quantity and temperature. Molding was performed by applying a pressing pressure of 120 MPa. Obtained molded products were measured for their molding densities. The molded products were sintered in nitrogen at 1380° C. for 90 minutes, and sintered products were measured for their densities, hardnesses, and deflective strengths. However, the densities were measured as relative densities. Results obtained as described above are shown in FIGS. 7, 8, and 9.

Figure 7:
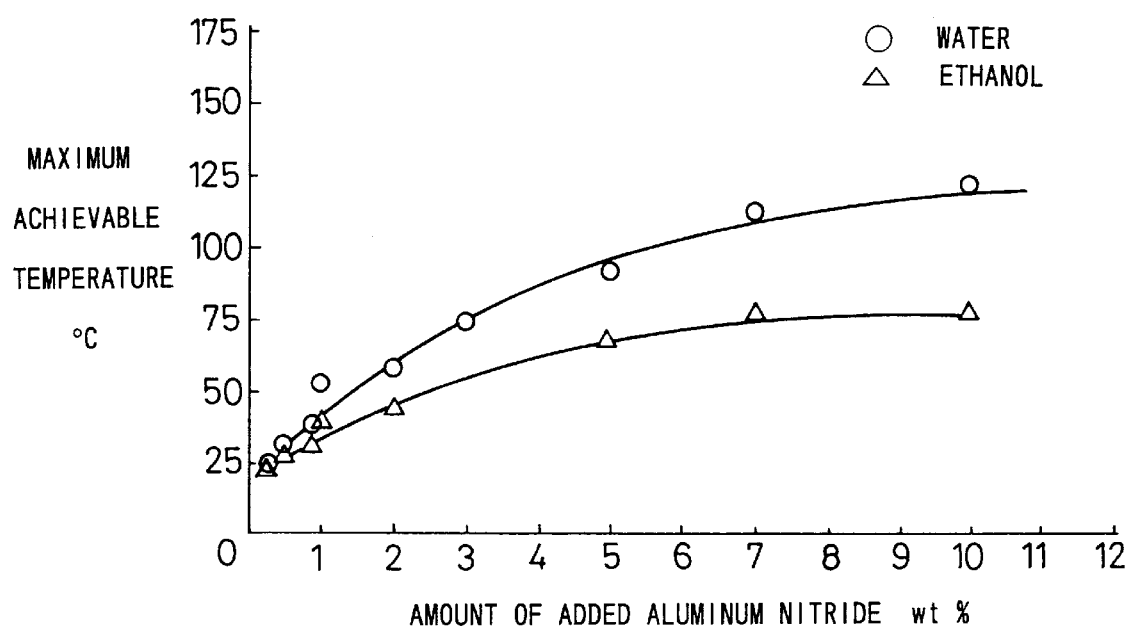
FIG. 7 shows a graph illustrating a result obtained in Example 2.

At first, when aluminum nitride was added to the basic composition, the temperature was clearly increased as the amount of aluminum nitride was increased from 0.8% by weight to 1.0% by weight. The rate of the increase in temperature was large (FIG. 7). Therefore, an amount of 1.0% by weight of aluminum nitride is required as a minimum amount to cause the reaction in a form of chain reaction.

With reference to FIG. 7, it is understood that when water is compared with ethanol, although the former has a larger specific heat than the latter, the former provides a higher achievable temperature, in which a large amount of reaction heat is generated. Therefore, it is desirable to use water provided that the system is not badly affected by water. In general, it has been hitherto considered that organic solvent is used for such a system from a viewpoint that physical properties are deteriorated by oxidation of metal cobalt. However, judging from the result shown in FIG. 7, it is considered that such an influence may be neglected.

Figure 8:
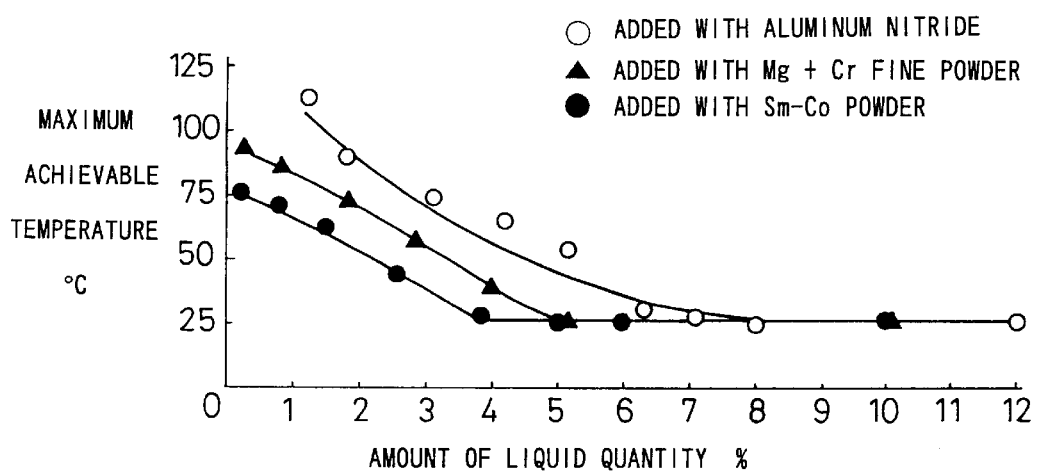
FIGS. 8 and 9 show graphs illustrating results obtained in Example 2.
Figure 9:
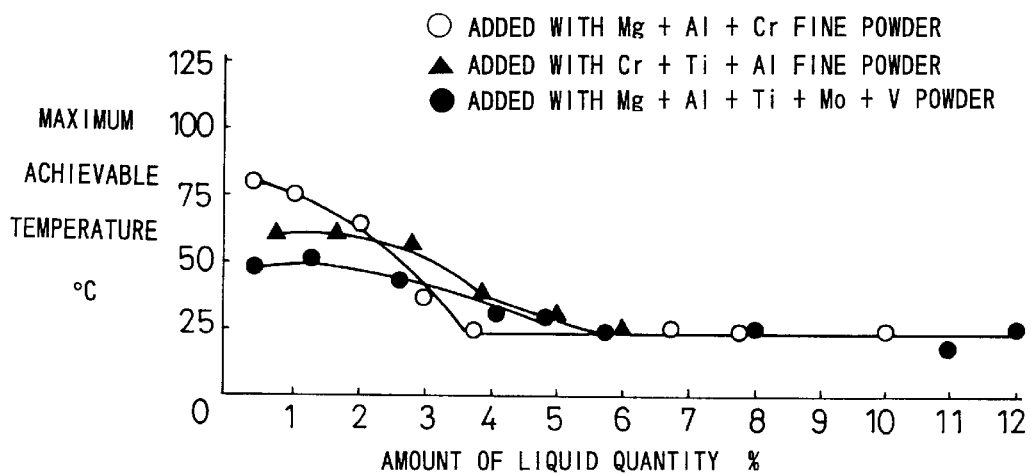

FIGS. 8 and 9 show relationships between the amount of liquid quantity and the achievable temperature, obtained when various components were replaced and added. The largest amount of reaction heat was generated when aluminum nitride was used. However, the increase in temperature was observed for other systems.

The gist of the present invention principally lies in the formation of necks formed on a part of the particles by the aid of mutual diffusion. Therefore, it is unnecessary to cause the reaction in an overall manner, and it is sufficient to cause the reaction in microscopic regions.

According to the facts described above, it is preferable to add aluminum nitride in the amount of at least not less than 1% by weight. Table 2 shows values of physical properties obtained when the molded products obtained in the foregoing experiments were actually sintered.

TABLE 2

|  | COMPARATIVE EXAMPLE | AlN 0.8% | AlN 1.0% | AlN 3.0% WATER | AlN 3.0% ALCOHOL | ADDED WITH Sm-Co |
|---|---|---|---|---|---|---|
| DENSITY OF MOLDED PRODUCT (%) | 48 | 56 | 58 | 58 | 58 | 57 |

TABLE 2-continued

|  | COMPARATIVE EXAMPLE | AlN 0.8% | AlN 1.0% | AlN 3.0% WATER | AlN 3.0% ALCOHOL | ADDED WITH Sm-Co |
|---|---|---|---|---|---|---|
| DENSITY OF SINTERED PRODUCT (%) | 100 | 100 | 100 | 100 | 100 | 99.8 |
| HARDNESS (HRA) | 92 | 92.1 | 92.5 | 92.7 | 92.7 | 92.4 |
| DEFLECTIVE STRENGTH (MPa) | 2200 | 2350 | 3200 | 3400 | 2900 | |

In Table 2, the comparative example was based on the basic system constructed in Example 2. The physical properties were measured by using test pieces cut out from the molded products. The molded product concerning the comparative example had a relative density of about 48%. However, all of the molded products produced according to the method of the present invention had values superior to the aforementioned value of the relative density. An effect of approximately 10% was obtained in the range recommended by the present invention in which the amount of added aluminum nitride was not less than 1.0% by weight. Accordingly, it has been confirmed by the present inventors that the percentage of linear contraction upon sintering is decreased to be about 16% from 23%, and the dimensional accuracy is also improved. As for the respective physical properties after the sintering, at least those obtained in the working examples performed in accordance with the method concerning the embodiment of the present invention were superior to those obtained in the comparative or conventional example. Especially, it is easily understood that the physical properties are greatly improved in the recommended range according to the embodiment of the present invention, and thus the present invention is effective.

According to the molding method for powder particles concerning the present invention, it is possible to obtain the following effects and advantages.

Namely, it is possible to obtain a preliminary molded product excellent in strength by enhancing the mutual bonding between particles in the preliminary molded product, and it is possible to provide powder particles excellent in molding performance.

When the method of the present invention is used to construct a super-heat resistant alloy by using powder comprising metal and ceramic, an alloy having heat resistance of a degree superior to those obtained by the conventional technique can be obtained, and a new alloy composition can be highly possibly created.

If parts or components having been hitherto joined by means of soldering are melted and fused by means of the self-exothermic reaction in accordance with the method of the present invention, it is possible to obtain advantages from viewpoints of reliability, strength, and cost.

What is claimed is:

1. A molding method for powder particles, comprising the steps of:

mixing a liquid additive with a powdery raw material to prepare a first mixture, and performing molding into a predetermined shape, said liquid additive being a liquid which causes an exothermic reaction with said powdery raw material, wherein an amount of liquid of said first mixture exceeds a predetermined amount;

adding a regulatory agent to said first mixture which reacts with at least one of said liquid additive and said powdery raw material to form a film layer on particles of said powdery raw material when said amount of liquid equals said predetermined amount, for suppressing said exothermic reaction;

gradually discharging said liquid until reaching said predetermined amount for causing said film layer to be formed; and thereafter, decreasing said amount of liquid further, beyond said predetermined amount, to cause said film layer to disappear and said exothermic reaction to occur, wherein said regulatory agent controls initiation of said exothermic reaction such that self-combusting reaction occurs in which generated heat accelerates the exothermic reaction.

2. The molding method according to claim 1, wherein said mixture is subjected to said molding in a mold by means of isostatic pressurization, and said liquid is gradually discharged from said mold during said isostatic pressurization for said mixture.

3. The molding method according to claim 1, wherein said mixture is subjected to said molding in a mold, and said liquid is discharged by exposing said mixture to air.

4. The molding method according to claim 1, wherein said powdery raw material is ceramic, metal, or composite powder thereof.

5. The molding method according to claim 1 wherein said powdery raw material is ceramic, metal, or composite powder thereof.

6. The molding method according to claim 4, wherein said ceramic is at least one or more than one selected from the group consisting of aluminum nitride, titanium nitride, silicon carbide, chromium nitride, and magnesium oxide.

7. The molding method according to claim 6, wherein said ceramic has an average particle diameter of not more than 10 μm.

8. The molding method according to claim 5, wherein said ceramic is at least one or more than one selected from the group consisting of aluminum nitride, titanium nitride, silicon carbide, chromium nitride, and magnesium oxide.

9. The molding method according to claim 8, wherein said ceramic has an average particle diameter of not more than 10 μm.

10. The molding method according to claim 4, wherein said metal is at least one or more than one selected from the group consisting of nickel, cobalt, aluminum, magnesium, chromium, vanadium, molybdenum, tungsten, silicon, and titanium, and said metal has an average particle diameter of not more than 10 μm.

11. The molding method according to claim 5, wherein said metal is at least one or more than one selected from the group consisting of nickel, cobalt, aluminum, magnesium, chromium, vanadium, molybdenum, tungsten, silicon, and titanium, and said metal has an average particle diameter of not more than 10 μm.

12. The molding method according to claim 4, wherein said powdery raw material contains at least not less than 1% by weight of aluminum nitride.

13. The molding method according to claim 5, wherein said powdery raw material contains at least not less than 1% by weight of aluminum nitride.

14. The molding method according to claim 4, wherein said liquid additive contains water and/or hydroxide as a major component.

15. The molding method according to claim 5, wherein said liquid additive contains water and/or hydroxide as a major component.

16. The molding method according to claim 5, wherein said regulatory agent is at least one or more than one selected from the group consisting of polyammonium carbonate, triisodecyl alcohol, vinyl butyral, stearic acid amine, carbamic acid ester, ammonium alginate, water-soluble phenol resin, polyvinyl acetal, and polyvinyl acetate, and said regulatory agent is added in a total amount of 0.1 g to 8 g with respect to 100 g of said powder particles.

* * * * *